US008863206B2

(12) United States Patent
Chen

(10) Patent No.: US 8,863,206 B2
(45) Date of Patent: Oct. 14, 2014

(54) AUTOMATICALLY POPULATING CONTENT ANTICIPATING FAILURE

(75) Inventor: Mi Chen, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 190 days.

(21) Appl. No.: 13/210,112

(22) Filed: Aug. 15, 2011

(65) Prior Publication Data

US 2013/0047041 A1    Feb. 21, 2013

(51) Int. Cl.
*H04N 7/173*      (2011.01)
*H04N 21/24*      (2011.01)
*H04L 29/14*      (2006.01)
*H04H 40/09*      (2008.01)
*H04H 20/40*      (2008.01)
*H04N 21/4627*    (2011.01)
*H04H 20/42*      (2008.01)
*G06F 11/00*      (2006.01)
*H04H 60/06*      (2008.01)
*H04N 21/254*     (2011.01)
*H04L 29/08*      (2006.01)
*H04N 21/262*     (2011.01)

(52) U.S. Cl.
CPC .......... *G06F 11/004* (2013.01); *H04N 21/2402* (2013.01); *H04L 69/40* (2013.01); *H04H 40/09* (2013.01); *H04H 20/40* (2013.01); *H04N 21/4627* (2013.01); *H04H 20/42* (2013.01); *H04H 60/06* (2013.01); *H04N 21/2541* (2013.01); *H04L 67/325* (2013.01); *H04N 21/26208* (2013.01)
USPC ............................................. 725/96; 725/97

(58) Field of Classification Search
USPC ................................................ 725/33, 96, 97
See application file for complete search history.

(56) References Cited

U.S. PATENT DOCUMENTS

| 2002/0113826 | A1* | 8/2002 | Chuang ........................ 345/835 |
| 2009/0125953 | A1* | 5/2009 | Porter et al. .................. 725/109 |
| 2009/0187948 | A1* | 7/2009 | Malik ............................. 725/49 |
| 2010/0218223 | A1* | 8/2010 | Simpson et al. ................ 725/58 |
| 2011/0137976 | A1* | 6/2011 | Poniatowski et al. ......... 709/203 |

* cited by examiner

*Primary Examiner* — Nasser Goodarzi
*Assistant Examiner* — Michael Hong
(74) *Attorney, Agent, or Firm* — Ingrassia Fisher & Lorenz, P.C.

(57) ABSTRACT

A content provider computing device that transmits content to receivers at scheduled air times receives information regarding conditions relating to the transmissions. The computing device also receives data regarding content that a receiver will record. The computing device evaluates the information and compares it with the data to determine that there is a risk of interrupted transmission. As a result, the computing device transmits the content to the receiver prior to the scheduled air time. The conditions may include weather conditions, power outage conditions, and/or any other conditions that may affect transmission. In various implementations, the computing device may include content controls prior to transmission that prevent the content from being accessed prior to specified times. In some cases, the content control may prevent all access. In other cases, the content control may prevent some kinds of access to the instance of content prior to particular times and allow others.

18 Claims, 2 Drawing Sheets

AUTOMATICALLY POPULATING CONTENT ANTICIPATING FAILURE

FIELD OF THE INVENTION

This disclosure relates generally to content transmission, and more specifically to transmitting content to be recorded to content receivers prior to the scheduled air time in anticipation of transmission failure at the scheduled air time.

SUMMARY

The present disclosure discloses systems and methods for automatically populating content in anticipation of failure. One or more content provider computing devices that transmits instances of content to one or more receivers at particular scheduled air times may receive information regarding various conditions that may relate to the transmissions. The content provider computing device may also receive data regarding at least one instance of content that a receiver will record. The content provider computing device may evaluate the information, compare the information with the data, and may determine that there is a risk that a condition will interrupt transmission. As a result, the content provider computing device may transmit the instance of content to the receiver prior to the scheduled air time.

The information regarding various conditions that may relate to the transmissions may include a variety of different conditions that may affect whether or not transmission may be interrupted. These conditions may include weather conditions such as rain conditions, sleet conditions, snow conditions, cloud cover conditions, and so on; power outage conditions such as power outages related to scheduled power network maintenance and so on; and/or any other conditions that may affect transmission of content by the by the content provider computing device to the content receiver.

In various implementations, the content provider computing device may include one or more content controls in the instance of content prior to transmission. The content control may prevent the instance of content that is received and stored by the content receiver from being accessed prior to the scheduled air time and/or other specified times. In some cases, the content control may prevent all access to the instance of content, possibly including access in order to indicate that the instance of content is even stored by the content receiver. However, in other cases, the content control may prevent some kinds of access to the instance of content prior to particular times and allow others, such as allowing access to portions of the instance of content when a scheduled air time associated with that portion has been reached but disallowing access to other portions when scheduled air times associated with those portions have not yet been reached.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
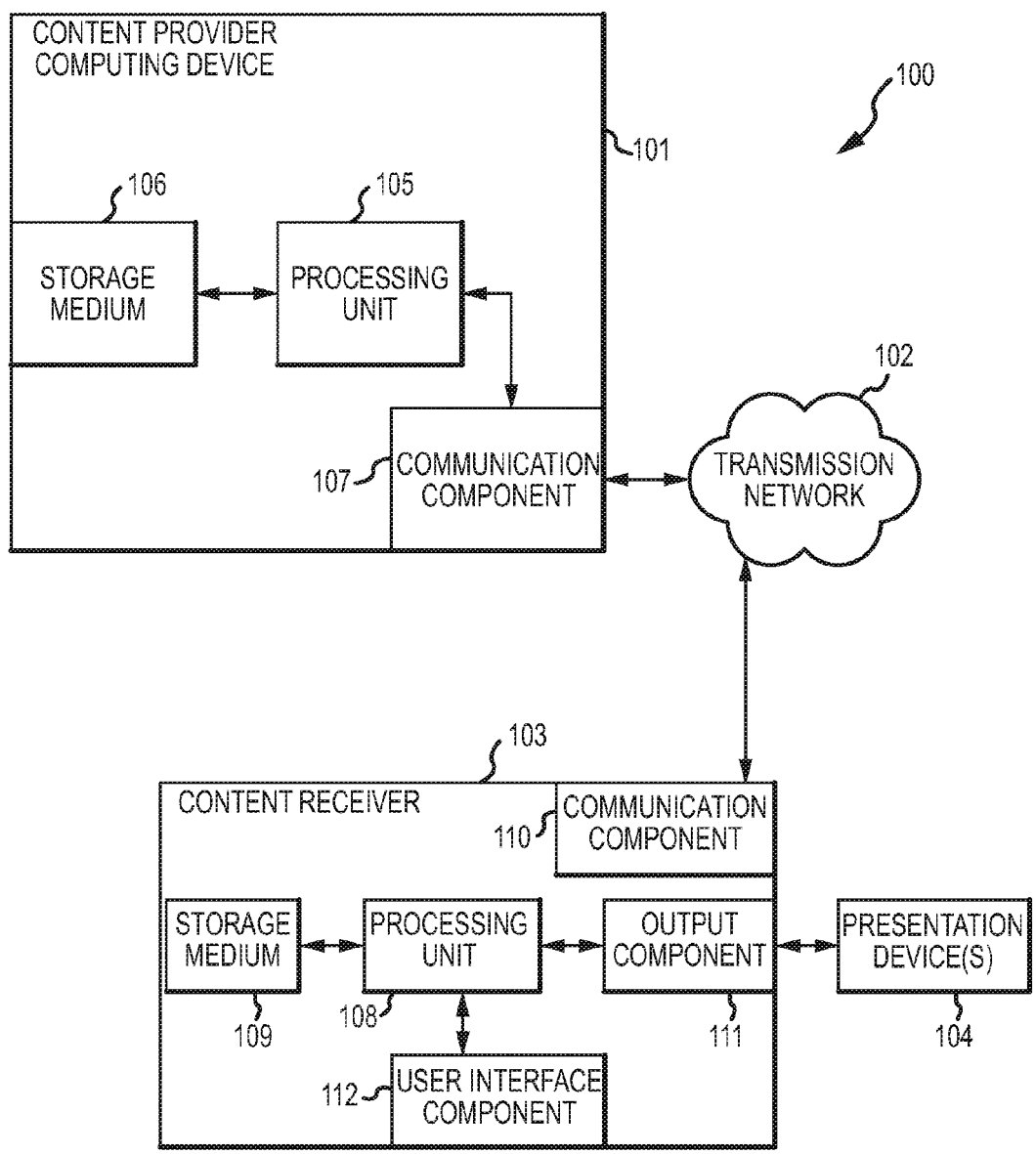
FIG. 1 is a block diagram illustrating a system for automatically populating content in anticipation of failure.

The description that follows includes sample systems, methods, and computer program products that embody various elements of the present disclosure. However, it should be understood that the described disclosure may be practiced in a variety of forms in addition to those described herein.

Content receivers, or receivers, (such as set top boxes, television receivers, digital video recorders, mobile computers, cellular telephones, smart phones, tablet computers, desktop computers, and so on) may receive content (such as television programs, movies, other kinds of video files, music, images, and so on) from one or more content providers (such as satellite television programming providers, cable television programming providers, Internet service providers, video on demand providers, pay-per-view movie providers, digital music providers, and so on) via one of more communication connections (such as satellite communication connections, coaxial cable communication connections, Internet communication connections, radio-frequency connections, and so on). Such content receivers may play such received content using one or more presentation devices to present the received content and/or may store the received content for later presentation.

In some cases, a content receiver may be configured to record one or more instances of content (such as utilizing one or more timers) that will be transmitted by one or more content providers at a scheduled air time. However, various kinds of conditions may interrupt one or more communication channels utilized by the content receiver to receive and record content from one or more content providers. Such conditions may include weather conditions that interrupt (whether partially or totally) wireless connections (such as satellite communication connections, Wi-Fi communication connections, radio-frequency communication connections, cellular communication connections, and so on); power outages that affect the content receiver, components of the content provider, and/or intermediate communication components, and so on. If such conditions interrupt the communication channel utilized by a content receiver to receive an instance of content, the content receiver may be unable to record the instance of content as intended. As such, the instance of content may not be available as expected to one or more users of the content receiver.

Moreover, some conditions that may interrupt such communication channels may be detectable or otherwise knowable in advance. For example, power outages may relate to one or more scheduled power company maintenance events for which the power company may issue one or more advanced notifications. By way of another example, one or more weather services may predict one or more instances of weather conditions (such as rain, snow, sleet, and so on) and may issue advance notifications for one or more geographic areas regarding the instances of weather conditions. However, even though such conditions may be detectable or otherwise knowable in advance, the circumstances of the conditions may be such that it may still not be possible for the content receiver to receive the transmitted instance of content from the content providers at the scheduled air time regardless of any precautions that may be taken. As such, even though the conditions may be detectable or otherwise knowable in advance, the content receiver may still not be able to receive (and thus record) the instance of content at the scheduled air time.

The present disclosure discloses systems and methods for automatically populating content in anticipation of failure. One or more content provider computing devices may be configured to transmit (or broadcast) instances content to one or more receivers at particular scheduled air times via one or more communication channels. The content provider computing device may receive information regarding various conditions that may relate to the transmission of those instances of content at the respective scheduled air times. The content provider computing device may also receive data regarding at least one instance of content that the receiver will record when transmitted by the content provider computing device at the scheduled air time. The content provider computing device may evaluate the information regarding the various conditions, compare the information with the data regarding the instance of content the receiver will record, and may determine that there is a risk that a condition will interrupt transmission of the instance of content at the scheduled air time. As a result, the content provider computing device may transmit the instance of content to the receiver prior to the scheduled air time. Hence, the condition does not prevent the instance of content from being recorded on the receiver by the scheduled air time.

FIG. 1 is a block diagram illustrating a system 100 for automatically populating content in anticipation of failure. The system 100 may include a content provider computing device 101 communicably connected to one or more content receivers 103 via one or more transmission networks 102. The content provider computing device may be any kind of computing device such as one or more server computers and/or other computing components configured to provide content to the receiver. The content receiver may be any kind of content receiver such as a set top box, a television receiver, a digital video recorder, a mobile computer, a cellular telephone, a smart phone, a tablet computer, a desktop computer, and/or any other kind of electronic device configured to receive content from the content provider computing device. The transmission network may be any kind of transmission medium configured to convey content transmitted by the content provider computing device to the content receiver such as one or more satellites, transmitters, satellite communication connections, internet protocol communication connections, coaxial cable communication connections, cellular communication connections, Wi-Fi communication connections, and so on.

The content provider computing device 101 may include one or more processing units 105, one or more non-transitory storage media 106 (which may take the form of, but is not limited to, a magnetic storage medium; optical storage medium; magneto-optical storage medium; read only memory; random access memory; erasable programmable memory; flash memory; and so on), and/or one or more communication components 107. The processing unit 105 may execute instructions stored in the non-transitory storage medium 106 to obtain one or more instances of content and transmit the instances of content to one or more content receivers (such as the content receiver 103) via the transmission network 102 utilizing the communication component 107 at one or more respective scheduled air times associated with the instances of content as well as electronic programming guide information associated with the instances of content.

The content receiver 103 may include one or more processing units 108, one or more non-transitory storage media 109 (which may take the form of, but is not limited to, a magnetic storage medium; optical storage medium; magneto-optical storage medium; read only memory; random access memory; erasable programmable memory; flash memory; and so on), one or more communication components 110, one or more output components 111, and/or one or more user interface components 112. The processing unit 108 may execute instructions stored in the non-transitory storage medium 109 to receive one or more instances of content from the content provider computing device 101 via the communication component 110, store such instances of content in the non-transitory storage media 109 (which may be performed based on one or more recording timers configured for the content receiver 103), and/or present received and/or stored instances of content on the presentation device 104 (which may be any device configured to present content such as a television, a computer monitor, a speaker, a liquid crystal display, a plasma screen display, a printer, and so on) via the output component 111. One or more operations performed by the processing unit 108 may be directed by one or more user inputs received via the user interface component 112, such as user input directing the processing unit 108 to set one or more timers to record one or more instances of content received from the content provider computing device 101.

The content provider computing device 101 may receive data from the content receiver 103 regarding one or more recording timers that have been configured for the content receiver 103 to record one or more instances of content that the content provider computing device will transmit to the content receiver at a respective air time. The content provider computing device may also receive information regarding one or more conditions that may relate transmission of content by the content provider computing device. These conditions may include weather information (such as predicted rain conditions, sleet conditions, snow conditions, cloud cover conditions, and so on) received from one or more weather prediction notification servers (not shown), power outage information (such as power outages related to scheduled power network maintenance and so on) received from one or more power service notification servers (not shown), and/or any other conditions that may affect transmission of content by the by the content provider computing device.

The content provider computing device 101 may evaluate the information regarding one or more conditions in order to determine whether the conditions may interrupt transmission of content by the content provider computing device. The content provider computing device may compare the information regarding conditions to the data regarding instances of content that the content receiver 103 is configured to record and may determine that there is a risk the transmission of an instance of content that the content receiver is configured to record will be interrupted. As a result of the determination, the content provider computing device may transmit the instance of content prior to the scheduled air time for the instance of content in order to avoid interruption of the transmission. Thus, the instance of content may be stored on the content receiver by the schedule air time despite any transmission interruptions possibly caused by the conditions.

For example, the communication provider computing device 101 may receive information that a thunderstorm is predicted for a geographic location that includes the content receiver 103 during a particular time frame. The communication provider computing device may also receive data that the content receiver 103 will record a particular television program to be received from the content provider computing device during the particular time frame. In this example, the particular television program will be transmitted by the communication provider computing device utilizing a satellite communication connection and the communication provider computing device may determine that there is a risk that the satellite communication connection may be interrupted by the predicted thunderstorm. As such, the communication provider computing device may transmit the particular television program to the content receiver prior to the particular time frame in order to avoid potential satellite communication connection problems caused by the predicted thunderstorm.

By way of a second example, the communication provider computing device 101 may receive information that a power outage is scheduled for a geographic location that includes the content receiver 103 during a particular time frame so that the power service provider for the geographic location may upgrade power network equipment. The communication provider computing device may also receive data that the content receiver 103 will record a particular movie to be received from the content provider computing device during the particular time frame. In this example, the communication provider computing device may determine that there is a risk that the content receiver will not have power during the particular time frame due to the scheduled power outage and will be unable to receive and record the movie during that particular time frame. As such, the communication provider computing device may transmit the movie to the content receiver prior to the particular time frame in order to avoid the scheduled power outage.

As part of transmitting the instance of content prior to the scheduled air time for the instance of content, the content provider computing device 101 may select one or more alternative times prior to the scheduled air time and may transmit the instance of content at one or more of the alternative times. For example, the content provider computing device may select one or more alternative times when the content provider computing device and/or the content receiver will not otherwise be utilized, when the transmission network 102 will be less heavily utilized that other times, and so on. In this way the content provider computing device may prevent causing excessive network traffic and/or other problems by transmitting the instance of content prior to the scheduled air time.

In some cases, the content provider computing device 101 may not possess the instance of content as the time selected by the content provider computing device to transmit the instance of content prior to the scheduled air time. In such cases, the content provider computing device may obtain the instance of content as part of transmitting the instance of content prior to the scheduled air time.

In various implementations, even though the content provider computing device 101 may transmit the instance of content to the content receiver 103 prior to the scheduled air time in order to prevent transmission failure at the scheduled air time, the content provider associated with the content provider computing device may not allow the instance of content that is received and recorded by the content receiver to be accessible prior to the scheduled air time. For example, the content provider may be providing content obtained from a third party and may be under contract to that third party not to allow the content to be available prior to a scheduled air time. As such, prior to transmission content provider computing device 101 may include one or more content controls, such as one or more blocking codes, in the instance of content. The content control may prevent the instance of content that is received and stored by the content receiver from being accessed prior to the scheduled air time and/or other specified times (such as where the scheduled air time is not the initial air time for the instance of content the other specified time may be the initial air time for the instance of content).

In some cases, the content control included in the instance of content may prevent all access to the instance of content prior to the time specified in the content control. In such cases not only may the content control prevent the content receiver 103 from presenting the instance of content, the content control may also prevent the content receiver from providing any indication that the instance of content is even stored by the content receiver. For example, if the content receiver is configured to present one or more lists of content stored by the content receiver, the content control may prevent the instance of content from being included in such a list even though the instance of content is stored by the content receiver. As such, a user of the content receiver may be unaware that the content receiver stores the instance of content prior to the time that the content control allows the instance of content to be available.

However, in other cases, the content control included in the instance of content may prevent some kinds of access to the instance of content prior to particular times and allow others. By way of a first example, the content control may prevent the content receiver from presenting the instance of content prior to the scheduled air time but may allow the instance of content to be presented in a list of content prior to the scheduled air time.

By way of a second example, the scheduled air time may include a window of a number of units of time that each correspond to a portion of the instance of content. As such, the content control may prevent access to each of the portions of the instance of content prior to when the unit of time that corresponds to the respective portion is reached but may allow access to access to each of the portions of the instance of content as the unit of time that corresponds to the respective portion is reached. For instance, the scheduled air time for a particular television program may include a window of a particular hour and the particular television program may include portions that each correspond to one of the thirty-six hundred seconds in that particular hour. As each respective second in that particular scheduled air time hour is reached, the content control may allow access to the corresponding portion of the instance of content. Hence, even though the instance of content is stored, no more of the instance of content may be available via the content receiver 103 than would be available if the instance of content was being received at the scheduled air time. Thus, a user of the content receiver may be able to view portions of the instance of content as they are being aired and may be able to perform trick operations such as rewind and fast forward, but may not be able to fast forward to portions of the instance of content that have not yet been aired.

Figure 2:
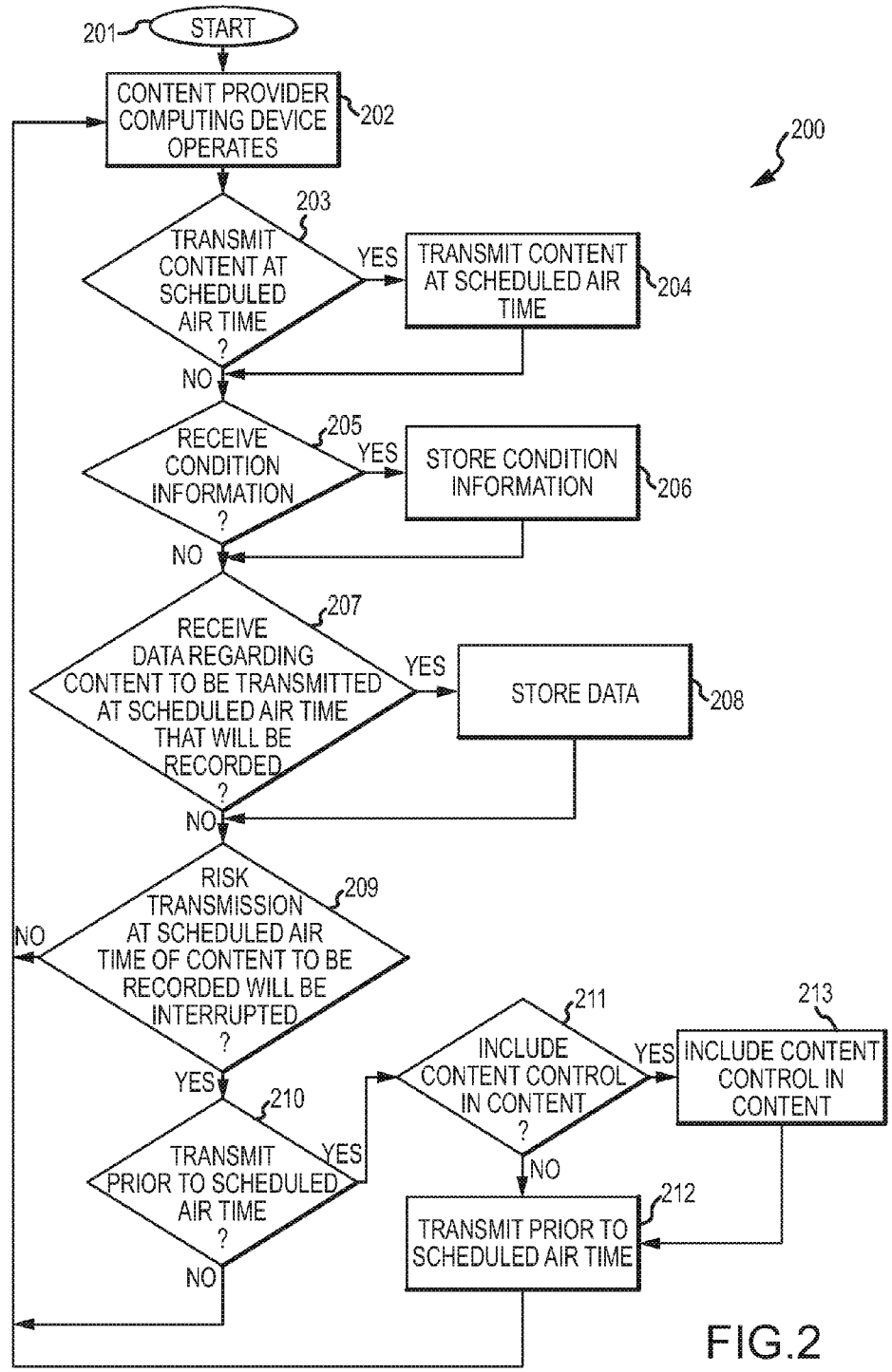
FIG. 2 is a flow chart illustrating a method for automatically populating content in anticipation of failure. This method may be performed by the system of FIG. 1.

FIG. 2 illustrates a method 200 for automatically populating content in anticipation of failure. The method 200 may be performed by the content provider computing device 101 of FIG. 1. The flow begins at block 201 and proceeds to block 202 where the content provider computing device operates. The flow then proceeds to block 203 where the content provider computing device determines whether or not the current time corresponds to a scheduled air time for transmitting one or more instances of content to one or more content receivers, such as the content receiver 103. If so, the flow proceeds to block 204 where the content provider computing device transmits the one or more instance of content that correspond to the scheduled air time before the flow continues to block 205. Otherwise, the flow proceeds directly to block 205.

At block 205, the content provider computing device 101 determines whether or not information regarding one or more conditions that may relate to transmission of content have been received. If so, the flow proceeds to block 206 where the content provider computing device receives and stored the information regarding the one or more conditions before the flow proceeds to block 207. Otherwise, the flow proceeds directly to block 207.

At block 207, the content provider computing device 101 determines whether or not data regarding content that will be recorded by the content receiver 103 when received from the content provider computing device has been received. If so, the flow proceeds to block 208 where the content provider computing device stores the data before the flow proceeds to block 209. Otherwise, the flow proceeds directly to block 209.

At block 209, the content provider computing device 101 determines based on the information regarding the one or more conditions and the data regarding content that will be recorded by the content receiver 103 whether or not there is a risk that the transmission of an instance of content that will be transmitted by the content provider computing device and recorded by the content receiver 103 may be interrupted. If not, the flow returns to block 202 and the content provider computing device continues to operate. Otherwise, the flow proceeds to block 210.

At block 210, after the content provider computing device 101 determines that there is a risk that the transmission may be interrupted, the content provider computing device determines whether or not to transmit the instance of content prior to the scheduled air time. In some cases, the content provider computing device may determine to transmit the instance of content prior to the scheduled air time any time that a risk of transmission failure is determined. In other cases, the content provider computing device may determine to transmit the instance of content prior to the scheduled air time under some circumstances but not other circumstances. These circumstances may depend on factors such as available bandwidth of the transmission network 102, services contracted for in customer service agreements, and so on. These circumstances may also include usage data received via the content receiver 103. For example, a user may have previously indicated via the content receiver that the user will be moving on a specific date. By way of another example, a user may have previously indicated via the content receiver that the user will watch and/or record a television program from the content provider. By way of a third example, the content receiver may be a mobile device and the usage data may include movement history of the mobile device, historical disconnection patterns concerning mobile device reception, and so on. If the content provider computing device determines not to transmit the instance of content prior to the scheduled air time, the flow returns to block 202 and the content provider computing device continues to operate. Otherwise, the flow proceeds to block 211.

At block 210, after the content provider computing device 101 determines to transmit the instance of content prior to the scheduled air time, the content provider computing device determines whether or not to include one or more content controls in the instance of content prior to transmission. The content provider computing device may make this determination based on a variety of different factors, such as whether the content provider associated with the content provider computing device is under contractual obligation not to allow access to the instance of content prior to the scheduled time and so on. If the content provider computing device determines not to include one or more content controls in the instance of content prior to transmission, the flow proceeds to block 212 and the content provider computing device transmits the instance of content prior to the scheduled air time before the flow returns to block 202 and the content provider computing device continues to operate. Otherwise, the flow proceeds to block 213 where the content provider computing device includes the one or more content controls in the instance of content before the flow proceeds to block 212 where the content provider computing device transmits the instance of content prior to the scheduled air time.

Although the method 200 is illustrated and described as including particular operations configured in a particular sequence, it is understood that other arrangements of different operations are possible without departing from the scope of the present disclosure. For example, in some implementations the content provider computing device 101 may not store data regarding content that will be recorded. Instead, in such implementations, the content provider computing device may compare data that is received against stored information regarding conditions to determine whether or not there is a risk a transmission that is to be recorded may be interrupted without first storing the data.

Returning to FIG. 1, in some implementations, the content provider computing device 101 may transmit an instance of content prior to the associated scheduled air time any time that the content provider computing device determines that there is a risk that transmission of the instance of content at the scheduled air time may be interrupted. However, in other implementations, the content provider computing device may perform such an operation in some circumstances but not others.

For example, the content provider computing device may receive one or more priority rankings (such as ratings from one to five where one is the highest priority and five is the lowest priority) from the content receiver 101 regarding instances of content that the content receiver will record. In this example, the content provider computing device may transmit an instance of content prior to the scheduled recording time if a priority rating received for the instance of content exceeds a priority rating threshold (such as a priority rating of three) but not if the priority rating received does not exceed the priority rating threshold. In this way, if only so many resources are available for such operations, the content provider computing device may attempt to allocate those resources to the instances of content that are more desired than other instances of content.

By way of another example, the content provider computing device 101 may provide content to different levels of service plans. A customer associated with the content receiver 103 may pay a higher service charge for a premier level service plan than a basic level service plan. In this example, the content provider computing device may transmit an instance of content prior to the scheduled recording time if the content receiver is associated with the premier level service plan but not if the content receiver is associated with the basic level service plan. In this way, purchasers of the premier level service plan may not be affected by transmission interruptions the way that purchasers of the basic level service plan might, providing an incentive for customers to purchase the premier level service plan.

By way of a third example, the instances of content may include one or more significance level ratings. In this example, content such as television show reruns may be assigned a low significance level rating, content such as new television shows may be assigned a medium significance level rating, and content such as television show premiers or finales may be assigned a high significance level rating. As such, the content provider computing device may transmit an instance of content prior to the scheduled recording time if the significance level rating exceeds a significance level rating threshold (such as high) but not if the significance level rating does not exceed the significance level rating threshold. In this way, if only so many resources are available for such operations, the content provider computing device may attempt to allocate those resources to the instances of content that are more significant if missed than other instances of content.

In various implementations, the content provider computing device 101 may transmit an instance of content prior to the scheduled recording time utilizing the same communication channel than the content provider computing device would have used to transmit the instance of content at the scheduled air time. However, in other implementations, the content provider computing device may transmit utilizing a different communication channel than would have been used at the scheduled air time. For example, the content provider computing device may transmit content at scheduled air times utilizing a satellite communication connection. However, when transmitting an instance of content prior to a corresponding scheduled air time in this example, the content provider computing device may utilize an internet protocol communication connection in order to preserve satellite communication bandwidth for scheduled air time transmissions.

In one or more implementations, any transmission of content prior to associated air times may be transparent to a user of the content receiver 103. Such content may not be available or even detectable to the user until the schedule air time and the user may thus not ever be aware that the content was not transmitted at the scheduled air time. However, in other implementations, the content provider computing device 101 may transmit one or more notifications to the content receiver that indicate that an instance of content has been transmitted prior to the scheduled air time and/or that conditions that may affect transmission at the associated scheduled time may occur. Such notifications may serve as advertisements of the features provided by the content provider associated with the content provider computing device, warnings for users regarding conditions that may affect them in other ways, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for automatically populating content in anticipation of failure, the method comprising:
receiving at one or more content provider computing devices information regarding at least one weather condition that relates to transmission of content from the one or more content provider computing devices to at least one receiver device;
receiving at the one or more content provider computing devices data regarding at least one instance of content that the one or more content provider computing devices will transmit to the at least one receiver device at a scheduled air time and which the at least one receiver device is configured to record;
determining, utilizing the one or more content provider computing devices, that there is a risk that the at least one weather condition will interrupt transmission of the at least one instance of content at the scheduled air time from the one or more content provider computing devices to the at least one receiver device; and
transmitting the at least one instance of content from the one or more content provider computing devices to the at least one receiver prior to the scheduled air time.

2. The method of claim 1, wherein the one or more content provider computing device includes at least one content control in the at least one instance of content that prevents the at least one instance of content stored by the at least one receiver from being accessed prior to the scheduled air time.

3. The method of claim 1, wherein:
the data regarding at least one instance of content includes a priority rating indicated by the at least one receiver, and said operation of transmitting the at least one instance of content from the one or more content provider computing devices to the at least one receiver prior to the scheduled air time further comprises transmitting the at least one instance of content from the one or more content provider computing devices to the at least one receiver prior to the scheduled air time if the priority rating exceeds a threshold priority rating.

4. The method of claim 1, wherein the one or more content provider computing devices transmit the at least one instance of content from the one or more content provider computing devices to the at least one receiver prior to the scheduled air time utilizing a different communication system than the one or more content provider computing devices would have used to transmit the at least one instance of content to the at least one receiver device at the scheduled air time.

5. The method of claim 1, further comprising instructing the at least one receiver to display at least one notification that the at least one instance of content has been received prior to the scheduled air time.

6. The method of claim 1, wherein said operation of transmitting the at least one instance of content from the one or more content provider computing devices to the at least one receiver prior to the scheduled air time further comprises:
selecting an alternative time prior to the scheduled air time; and
transmitting the at least one instance of content from the one or more content provider computing devices to the at least one receiver at the alternative time.

7. The method of claim 1, further comprising obtaining the at least one instance of content utilizing the one or more content provider computing devices prior to the scheduled air time.

8. The method of claim 2, wherein:
the schedule air time comprises a window including a plurality of units of time,
the at least one instance of content comprises a plurality of portions that each correspond to a unit of time of the plurality of units of time, and
the at least one content control included in the at least one instance of content prevents each portion of the at least one instance of content stored by the at least one receiver from being accessed prior to the unit of time of the plurality of units of time corresponding to the respective portion.

9. The method of claim 2, wherein the at least one content control included in the at least one instance of content prevents the at least one instance of content from being displayed by the at least one receiver in a listing of content stored by the at least one receiver prior to the scheduled air time.

10. A system for automatically populating content in anticipation of failure, comprising:
at least one content provider computing device, comprising:
at least one communication component that receives:
information regarding at least one weather condition that relates to transmission of content from the at least one content provider computing device to at least one receiver device; and
data regarding at least one instance of content that the at least one content provider computing device will transmit to the at least one receiver device at a scheduled air time and which the at least one receiver device is configured to record; and
at least one processing unit that determines that there is a risk that the at least one weather condition will interrupt transmission of the at least one instance of content at the scheduled air time from the at least one content provider computing device to the at least one receiver device;
wherein the at least one processing unit transmits the at least one instance of content via the at least one communication component from the at least one content provider computing device to the at least one receiver prior to the scheduled air time.

11. The system of claim 10, wherein the at least one processing unit obtains the at least one instance of content via the at least one communication component prior to the scheduled air time.

12. The system of claim 10, wherein the at least one processing unit transmits the at least one instance of content via the at least one communication component from the at least one content provider computing device to the at least one receiver by selecting an alternative time prior to the scheduled air time and transmitting the at least one instance of content at the alternative time.

13. The system of claim 10, wherein the at least one processing unit instructs the at least one receiver via the at least one communication component to display at least one notification that the at least one instance of content has been received prior to the scheduled air time.

14. The system of claim 10, wherein the at least one processing unit transmits the at least one instance of content via the at least one communication component from the at least one content provider computing device to the at least one receiver prior to the scheduled air time utilizing a different communication system than the at least one processing unit would have used via the at least one communication component to transmit the at least one instance of content to the at least one receiver device at the scheduled air time.

15. The system of claim 10, wherein the data regarding at least one instance of content includes a priority rating indicated by the at least one receiver and the at least one processing unit transmits the at least one instance of content via the at least one communication component from the one or more content provider computing devices to the at least one receiver prior to the scheduled air time if the priority rating exceeds a threshold priority rating.

16. The system of claim 10, wherein the at least one processing unit includes at least one content control in the at least one instance of content prior to transmission that prevents the at least one instance of content stored by the at least one receiver from being accessed prior to the scheduled air time.

17. The system of claim 16, wherein the schedule air time comprises a window including a plurality of units of time, the at least one instance of content comprises a plurality of portions that each correspond to a unit of time of the plurality of units of time, and the at least one content control included in the at least one instance of content prevents each portion of the at least one instance of content stored by the at least one receiver from being accessed prior to the unit of time of the plurality of units of time corresponding to the respective portion.

18. The system of claim 16, wherein the at least one content control included in the at least one instance of content prevents the at least one instance of content from being displayed by the at least one receiver in a listing of content stored by the at least one receiver prior to the scheduled air time.

* * * * *